US009098177B2

(12) United States Patent
Das

(10) Patent No.: US 9,098,177 B2
(45) Date of Patent: Aug. 4, 2015

(54) APPARATUS AND METHODS FOR FACILITATING CONTEXT HANDOFF BETWEEN DEVICES IN A CLOUD BASED WIRELESS PERSONAL AREA NETWORK

(71) Applicant: Google Technology Holdings LLC, Mountain View, CA (US)

(72) Inventor: Sujoy Das, Grayslake, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 141 days.

(21) Appl. No.: 13/713,042

(22) Filed: Dec. 13, 2012

(65) Prior Publication Data

US 2014/0173447 A1 Jun. 19, 2014

(51) Int. Cl.
*G06F 3/00* (2006.01)
*G06F 3/0484* (2013.01)

(52) U.S. Cl.
CPC .................................. *G06F 3/04842* (2013.01)

(58) Field of Classification Search
CPC ...... G06F 9/4445; G06F 21/31; H04L 63/083
USPC .......................................................... 715/738
See application file for complete search history.

(56) References Cited

U.S. PATENT DOCUMENTS

| | | | | |
|---|---|---|---|---|
| 5,558,339 | A | 9/1996 | Perlman | |
| 5,586,257 | A | 12/1996 | Perlman | |
| 6,138,147 | A | 10/2000 | Weaver et al. | |
| 7,039,698 | B2 | 5/2006 | Slemmer et al. | |
| 7,681,203 | B2 | 3/2010 | Mandato et al. | |
| 8,155,664 | B2 | 4/2012 | McFarland | |
| 8,224,894 | B1 | 7/2012 | Parks et al. | |
| 2003/0233660 | A1 | 12/2003 | Slemmer et al. | |
| 2004/0023722 | A1 | 2/2004 | Vuong et al. | |
| 2004/0203378 | A1 * | 10/2004 | Powers | 455/41.2 |
| 2006/0026171 | A1 | 2/2006 | Savage | |
| 2007/0105496 | A1 | 5/2007 | Bonta et al. | |
| 2007/0136488 | A1 | 6/2007 | Cho et al. | |
| 2009/0259711 | A1 | 10/2009 | Drieu et al. | |
| 2010/0269152 | A1 * | 10/2010 | Pahlavan et al. | 726/3 |
| 2011/0106755 | A1 | 5/2011 | Hao et al. | |
| 2012/0011511 | A1 | 1/2012 | Horvitz et al. | |
| 2012/0198508 | A1 | 8/2012 | Kuo | |
| 2014/0033058 | A1 * | 1/2014 | Perotti | 715/740 |
| 2014/0171064 | A1 | 6/2014 | Das | |
| 2014/0173036 | A1 | 6/2014 | Das | |

OTHER PUBLICATIONS

Office Action dated Dec. 4, 2014 in U.S. Appl. No. 13/713,041.

* cited by examiner

*Primary Examiner* — Omar Abdul-Ali
(74) *Attorney, Agent, or Firm* — Byrne Poh LLP

(57) ABSTRACT

An apparatus obtains application state information for another device and displays a login screen on a display that provides information for at least one application running on the other device. The information displayed may be an icon corresponding to an application running on the other device. The application state information may include an application identifier, a content identifier and a pointer to a location at which a given content is accessed by the application. An apparatus includes a display, application state monitor logic, operative to obtain application state information for another device, and login screen configuration logic, operatively coupled to the display. The login screen configuration logic is operative to configure a login screen on the display to provide information for at least one application running on the other device, based on the application state information for the other device obtained by the application state monitor logic.

20 Claims, 11 Drawing Sheets

APPARATUS AND METHODS FOR FACILITATING CONTEXT HANDOFF BETWEEN DEVICES IN A CLOUD BASED WIRELESS PERSONAL AREA NETWORK

CROSS-REFERENCE TO RELATED APPLICATIONS

The present disclosure is related to co-pending U.S. patent application Ser. No. 13/713,041, "SYSTEM AND METHODS FOR A CLOUD BASED WIRELESS PERSONAL AREA NETWORK SERVICE ENABLING CONTEXT ACTIVITY HANDOFFS BETWEEN DEVICES," and U.S. patent application Ser. No. 13/713,045, "SYSTEM AND METHODS FOR PREVENTING INTERRUPTIONS DUE TO BATTERY DRAIN DURING STREAMING MEDIA SESSIONS BETWEEN DEVICES," both of which are assigned to the same assignee as the present application, and both of which are hereby incorporated by reference herein.

FIELD OF THE DISCLOSURE

The present disclosure relates generally to cloud based service provisioning and to personal area networks.

BACKGROUND

Electronic communications devices such as smartphones, tablets and laptops have become pervasive in society and most users own several such devices. Peer-to-peer (P2P) networking and so-called wireless personal area networks (WPANs or PANs) may be established between devices using various wireless connectivity capabilities such as Bluetooth™, Wireless USB, ZigBee, or other technologies, etc. While such WPANs or P2P networks enable device connectivity, they do not address the issue of seamlessly accessing content on several devices. For example, a user may access content on a smartphone using an Internet browser. If the user owns a laptop, the user may at some time want to switch to using the laptop, or some other convenient device, to access the same content, that is, by switching over from one device to another. Although the user may access the same content on a laptop, the user must proceed through several steps in order to do so. That is, the user must login to the laptop, access a browser application, enter an address for the content into the browser and possibly scroll to a point in a video or document, or some other content, to resume access at the same point access was terminated on the smartphone device. If content is downloaded directly to a given device. The user is somewhat limited in being able to access the content unless the user has physical access to the given device that stores the desired content.

DETAILED DESCRIPTION

Figure 1:
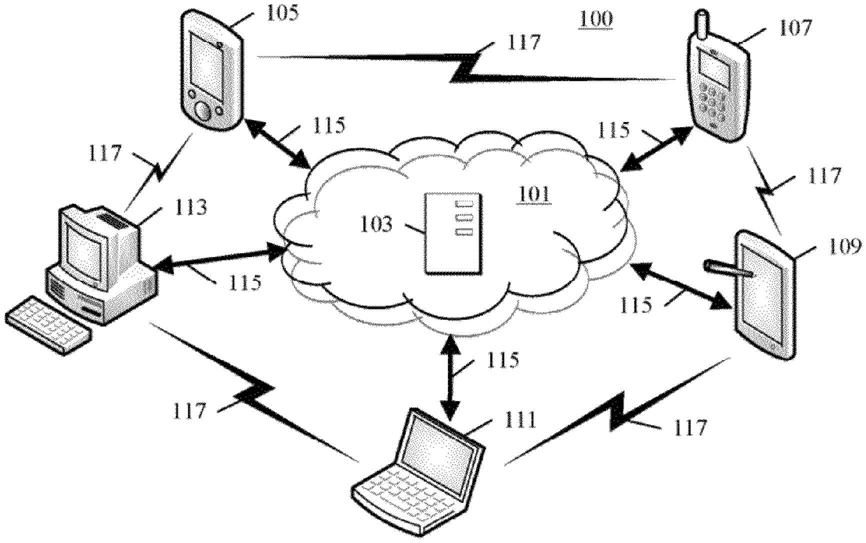
FIG. 1 is a block diagram of cloud based personal area network (PAN) service in accordance with an embodiment.

The present disclosure provides systems, apparatuses and methods for a cloud based service for creating context and profile based personal area networks. Multiple devices belonging to a user may be interconnected to each other by using the herein disclosed cloud service. The resulting cloud based personal area network (PAN) provides an enhanced user experience for multi-media, call connection and other related activities, by enabling the user to access and interact with the same application in the same way when moving from one device to another. The PAN nodes, in accordance with the embodiments, compensate and complement each other by "context switching," that is, performing context handoffs between each other when appropriate during user related sessions. The PAN nodes are the various electronic communication devices that may be associated with a PAN by a user. The user experience is not hindered by any given device type or device profile because the networked devices act as gateways enabling the user to access content in a seamless manner.

The disclosed embodiments provide a method of operation including associating a plurality of devices with a single network identifier and defining a network including each device of the plurality of devices. A cloud based server component which may be implemented as, for example, a cloud based software application, creates a peer table containing peer-to-peer connectivity information for each device of the network and including context activity information for at least one device of the network. The peer table is sent to each device of the network by the cloud server component, and context activity updates are received by the cloud server component from at least one device, designated as an "active device" for the network. The peer table is updated according to the received context activity updates and the updated peer table is sent out to each device of the network. That is, each PAN node maintains a peer table image of the master peer table stored by the cloud server component and receives periodic updates.

Creating the peer table involves obtaining a device profile from each device of the network and creating the peer table by getting the peer-to-peer connectivity information from the device profiles. The peer-to-peer connectivity information includes hardware addresses for the devices.

The method may further include the cloud based server component providing a service module to each device of the network. The service module is installable on each device and is operative to monitor context activity on a respective device among other things. The cloud based server component may then receive context activity updates via the service module of at least one device.

The cloud server component may, in some embodiments, access or provide content related to the context activity on at least one device via the service module of the at least one device and also provide access to the content to a second device. In some embodiments, a virtual map may be created that indicates the proximity of each device to other devices of the network. The cloud server may use the proximity information contained in the virtual map for determining an appropriate device for performing a context handoff. The cloud server component receives periodic updates from each service module including battery power level, proximity or last context activity. The peer table is updated using the periodic updates. The cloud server component may also receive a context handoff request from a first device of the network and forward the context handoff request to a second device of the network, or may direct context handoff operations between devices. The battery power level, proximity or other criteria may be used for determining an appropriated device for forwarding the context handoff request.

The cloud server component may receive the context activity update indicating a change in context activity from an active device, and send a message to a second device service module to reconfigure the second device to launch an application corresponding to the change in context activity. The peer table is also updated to indicate the new context activity for the active device.

The disclosed embodiments provide a cloud based system having a cloud server component, operative to associate a plurality of devices with a single network identifier and define a network including each device of the plurality of devices. The cloud server component obtains and stores a device profile for each device of the network, maintains a database including the stored device profiles and having context activity information for each device of the network, and receives updates of the context activity information from each device. The cloud based system also requires a service module installed on each device of the network. The service module is operative to monitor a respective device for context activity changes and provide updates of the respective device context activity to the cloud server component, and perform a context activity handoff with any one of the devices of the network that is a context active device, in response to context activity changes or status changes of the context active device recorded in the database.

The service module is further operative to receive a peer table from the cloud server component, with peer-to-peer connectivity information for each device of the network and including context activity information for at least one device of the network. The service module also facilitates performing a context handoff operation with another device of the network by detecting a context activity change or device status change of a context active device via the peer table, and launching a device application related to the context activity of the context active device automatically to initiate context activity identical to the context activity of the context active device. The service module may also access content related to the context activity on the context active device via the cloud server component and via the service module of the context active device. The content access may also be achieved via a peer-to-peer connection initiated automatically using the peer-to-peer connectivity information contained in the peer table.

The cloud server component or the service modules may also provide a graphical user interface (GUI) for display on any of the network devices in communication with the cloud server component. The GUI includes a navigable initial page having a plurality of selections and a plurality of setting inputs for each device of the network, navigable by selecting some specific device of the network and providing corresponding setting selections for determining conditions under which context activity should be handed off from or to, the respective device. The service module is operative to perform context handoff operations for a respective device based on settings provided for the respective device via the GUI.

Another aspect of the embodiments is a method of operation that provides a streaming media session from a source to a receiving device for media content. The method determines that time remaining to complete the streaming media session for the media content is greater than time of remaining battery power for the source, and redirects the streaming media session to the receiving device. The method detects that the remaining battery power is below a threshold in the source and, in response, obtains a compressed data file containing at least a remaining portion of the media content, in response to a low battery condition at the source.

Another aspect of the embodiments is a method including obtaining application state information for a first device, and displaying a login screen on a display of a second Turning now to the drawings wherein like numerals represent like components, FIG. 1 illustrates a personal area network (PAN) 100 that is defined, established and controlled by a cloud based personal area network (PAN) service 101 in accordance with the embodiments. A user may access the cloud based PAN service 101 using any of a number of various electronic communication devices such as, but not limited to, a PDA 105, smartphone 107, tablet 109, laptop 111, or a desktop PC 113, or some other suitable device. Each of these devices may access a cloud server 103 to access the cloud based PAN service 101. The cloud based PAN service 101 may include a plurality of cloud servers and storage and therefore cloud server 103 is shown only for purpose of example and explanation. The cloud server 103 may host one or more cloud based applications, one of which may be the cloud server component that provides the features and functions herein described. The cloud based PAN service 101 may therefore be implemented as a cloud based application and may be considered a "network as a service" (NaaS) where a user may create and setup networks using the cloud based NaaS (i.e. via the cloud based application). It is to be understood that the cloud based server component, which may be a cloud based application, may therefore be distributed in a cloud based system comprised of two or more cloud servers and may utilize cloud based memory and database capabilities that may also be distributed. For purposes of explanation, references to the cloud server 103 and discussion of communication with the cloud server 103 refers to the cloud server component of the various embodiments and communication with the cloud server component, respectively. However, it is also to be understood that the cloud server 103 may provide other cloud based services or cloud based content and therefore may have features and functions in addition to the cloud server component of the embodiments. That is, the cloud server 103 provides the cloud server component function in accordance with the embodiments but need not be dedicated to only providing the cloud server component function.

Any of the various electronic communication devices shown in FIG. 1 may access and communicate with the cloud server 103, and thus with the cloud server component, for example, via an Internet connection 115 or other network connection, to access the cloud based PAN service 101. The Internet connection 115 may be accomplished via a wireless connection. Each of the electronic communication devices may also form a peer-to-peer connection with any other of the electronic communication devices via a wireless peer-to-peer link 117. The wireless peer-to-peer links 117 may use any suitable technology such as, but not limited to, Bluetooth™, Wireless USB, ZigBee, WiFi or other suitable technologies, etc.

Figure 2:
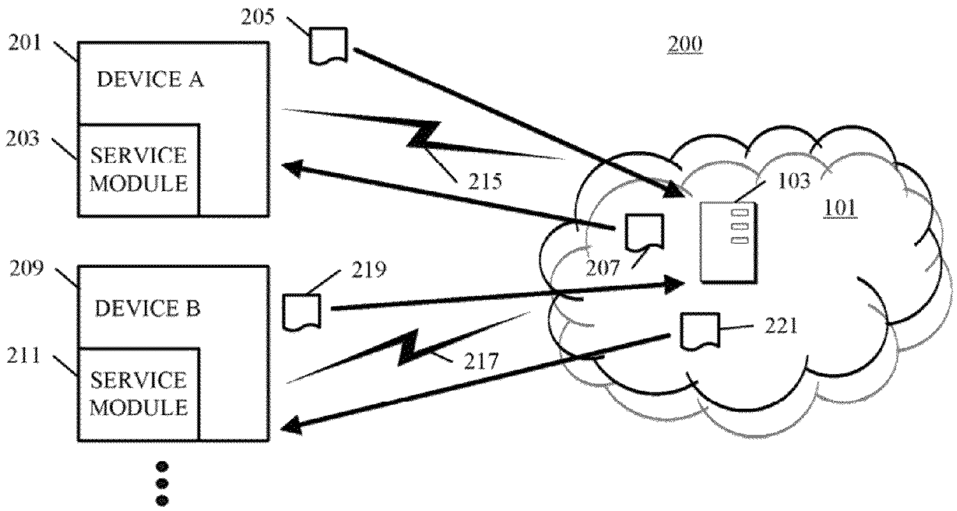
FIG. 2 is block diagram of devices communicating in a cloud based PAN service, each device having a service module in accordance with an embodiment.

FIG. 2 illustrates how an electronic communication device may be initially set up as a network node (or "PAN node") on the cloud based PAN service 101. Device A 201 and device B 209 are both electronic communication devices of the types shown in FIG. 1 or are some other suitable type of electronic communication devices. In accordance with the embodiments, each device must connect to the NaaS, i.e. the cloud based PAN service 101, at least once to establish itself as a peer on the network. For example, the user may log in to the cloud based PAN service 101, using device A 201, device B 209 and any other device that the user wishes to add to his or her PAN, by accessing a cloud server such as cloud server 103 which hosts the cloud based PAN service 101 cloud server component. The user may also add or remove devices to and from the PAN at any time by accessing a PAN management user interface that is provided by the cloud server 103. In the example shown in FIG. 2, the user may initially access the cloud based PAN service 101, using device A 201, via a wireless Internet connection 215. The user may log in using a user ID and password that is established during initial account setup with the NaaS cloud based PAN service 101. That user ID is then associated with any devices that the user wishes to add to the PAN. Put another way, the user ID is mapped to at least one PAN and serves as a single network identifier. Each device may be associated with one or more PANs where each PAN has its own unique user ID, i.e., its own unique single network identifier. In one example embodiment, the user ID may be a Google-ID but is not limited to such.

In the example of FIG. 2, device A 201 is the first device to be associated with the user's cloud based PAN 200. Device A 201 sends the cloud server 103 a device profile 205 over the wireless Internet connection 215. The device profile 205 may include the user ID, a device alias, and peer-to-peer connectivity information including various device addresses such as a MAC address, Bluetooth™ hardware address, WiFi hardware address, etc. The cloud server 103 stores the device profile 205 and, in response, sends device A 201 a peer table 207 over the wireless Internet connection 215. Initially, the peer table may be blank because device A 201 is the only device in the PAN thus far. In other words, the peer table would be blank because device A 201 currently has no peers. The cloud server 103 also provides a service module 203 to device A 201 which may be via a download or push operation. A device A 201 user interface may request confirmation from the device A 201 user that the user wishes to install the service module 203. If confirmed, the service module 203 will be installed on device A 201.

The service module 203 may be implemented as software or firmware, i.e. "code" or "executable instructions" for execution by one or more processors and that may be stored in a non-transitory, non-volatile memory. The service modules run on the respective devices as a background service and provide periodic device context activity information updates, and possibly other updates and information, to peer devices, to the NaaS cloud based PAN service 101 or to both. For example, the periodic updates may include "status" such as battery power level, location information, etc. The periodic updates may also include application state machine information. The cloud server 103 maintains a database that includes the peer table 207, which is updated based on the individual device context information updates received by the cloud server 103. Each device also maintains a database and has its own local copy (i.e. an image) of the peer table stored by the cloud server 103. The device local copy of the peer table may be updated by receiving broadcast updates from peers within the radio frequency (RF) coverage area of the PAN, or from the cloud server 103 when the given device is connected to the Internet. The peer broadcast updates, as well as updates received from the cloud server 103, may include timestamps or may use some other numbering or indexing scheme to help determine which received updates are the most recent. Database management techniques may be used to manage and synchronize the peer table local copies maintained by the devices and the master copy maintained by the cloud server 103. That is, database management is used to determine which received peer table updates are valid, and to prevent data collision issues that may occur due to updates occurring too close within a time window. The cloud server 103 may also send occasional update requests to the devices via each device's respective device service module, in order to receive updates from the devices and thus refresh the peer table master copy stored by the cloud server 103. It is to be understood that the peer table master copy may be stored in memory that is either integrated with cloud server 103 or remote from cloud server 103. The memory that stores the peer table master copy may also be distributed between various disks or servers at various locations.

When the user wishes to add another device to the PAN, such as device B 209, device B 209 will be used to log in to the NaaS cloud based PAN service 101 over the wireless Internet connection 215, and will send the device B profile 219 to cloud server 103 via Internet connection 217. Device B 209 will then obtain and install the service module 211 from the cloud server 103. The cloud server 103 will then update the peer table 207, using the device B profile 219, and send an updated peer table 221 to device B 209 via the service module 211. The updated peer table 221 will include the profile information for device A 201 and device B 209. If device A is connected to the Internet, the cloud server 103 will also send updated peer table 221 to the service module 203 of device A 201, or, in some embodiments, will provide updates to the device A 201 peer table copy with appropriate time stamps to facilitate database management. After the device A 201 and device B 209 peer tables are updated, the devices can update each other directly via a wireless peer connection, or may continue to receive updates from the cloud server 103 via Internet connections. Any one of the devices may become an "active" device my engaging in some context activity, at which point the service module of the active device will send context activity updates to the cloud server 103 and the cloud server 103 will update the peer table master copy accordingly.

Figure 3:
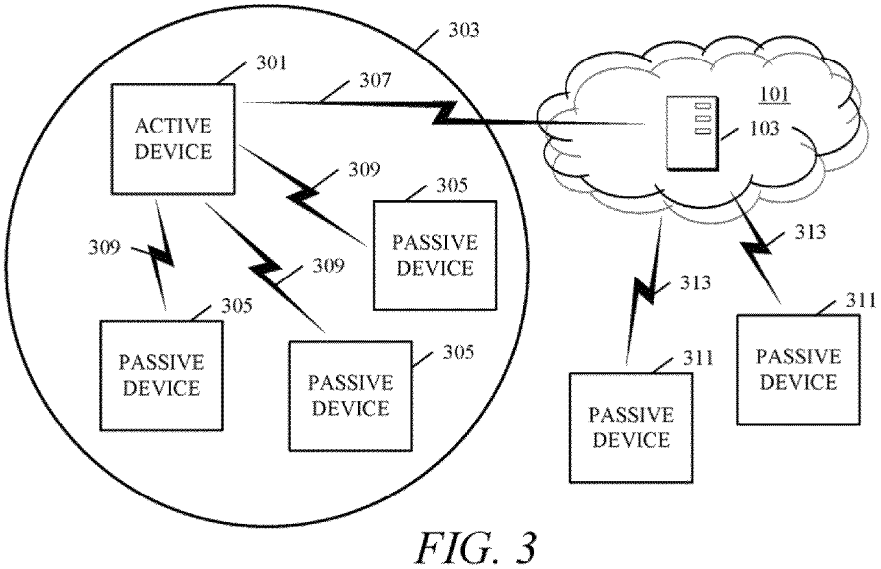
FIG. 3 is diagram showing a cloud based PAN service with various devices in active or passive states, with some passive device being outside a radio frequency (RF) range of the active devices of the PAN.

An active PAN and some of the PAN operations in accordance with an embodiment are illustrated by FIG. 3. The wireless connection technologies of the various devices of the PAN have a maximum radio frequency ("RF") coverage range 303 as illustrated by a circle. It is to be understood that the RF coverage range 303 is not actually circular but is shown as a circle for the purpose of simplicity of explanation. Also, some devices may have longer or shorter RF ranges than others based on the technology employed, physical location, or other factors that impact RF fading or shadowing, etc. An active device 301 is one that is currently being used and that may be engaged in a context activity such as, but not limited to, Internet browsing, document editing or viewing, email, electronic messaging, video playback, audio playback, receiving streaming media in a streaming media session, or etc. Other devices that may be turned on, but that are not actively being used, are referred to as "passive devices" 305. The active device 301 will occasionally broadcast its context activity information to the passive devices 305, using a broadcast capability of wireless connection 309 and by way of each passive device's respective service module, and will also provide updates of its context activity information to the cloud server 103 via an Internet connection 307. The passive devices 305 and 311 will receive context activity updates from the cloud server 103. However, at times when Internet connectivity is disconnected or is not available, the passive devices 305 and 311 will listen for peer-to-peer broadcasts within the RF coverage range 303 in order to obtain the context activity updates. Any given passive device of passive devices 305 and 311 that are members of the PAN, may take over the context activity of the active device 301 as will be described in further detail below.

A "context activity" as used herein involves an action on the device such as, but not limited to, telephony operations such as placing a phone call or video call, a chat or messaging session, video, movie or audio playback, Internet browsing or other content browsing, document editing or viewing, electronic book viewing, receiving or sourcing streaming media in a streaming media session, gaming or etc.

The context activity may require use of an application related to the given context activity. The device may therefore utilize an application resident on the device or may utilize a cloud based application. Further, the context activity may require content such as, but not limited to, a media file such as audio or video, a document file, or some other type of content. This content may be located on one of the devices or may be stored by the cloud server or may be stored or provided by some other Internet server.

The cloud based PAN service according to the embodiments enables access of content by any network device regardless of where the content is located. That is, content may be accessed on one device by other devices in the defined network either via the cloud server component acting as an intermediary or via a peer-to-peer connection established automatically using information provided by a cloud server component such as that information provided in the peer table. The embodiments enable context activity handoffs (also referred to herein as "context handoffs") in which a device may take over or resume a context activity of another device due to user movement, device failure (such as battery failure or connection failure) or user preferences and settings, either automatically or by direction of the cloud based server component.

As shown in FIG. 3, some passive devices 311 of the PAN may be outside of the RF coverage range 303 with the active device 301 and therefore may be unable to receive the context activity or peer table updates from the active device 301. Also, the passive devices 311 cannot access any content located on active device 301 via peer-to-peer access. The passive devices 311 will therefore obtain any peer table updates from the cloud server 103 by way of wireless Internet connections 313. That is, all devices designated as being members (i.e. nodes) of the PAN are able to receive peer table updates either from the active device 301 in a peer-to-peer manner, or from the NaaS cloud based PAN service 101 via the Internet. In some situations, Internet connectivity may also not be available. The cloud server 103 keeps track of when and/or how often devices synchronize, i.e. update, their respective local peer tables with the cloud server 103 master peer table. When devices have not been updated for a pre-determined period of time, determined by the cloud server 103, these devices will be placed in a "no-op state." That is, non-updated devices that are past an acceptable update time-out period are considered to be, at least temporarily, unavailable to the PAN for context switching operations.

The cloud server 103 may also act as an intermediary between devices. For example, the active device 301 may access content on the passive devices 311 by going through the cloud server 103. In other words, the cloud server 103 provides the active device 301 with a view into the content stored and available on the passive devices 311 as well as passive devices 305. All permission settings to access content are also controlled by the cloud server 103. These permission settings are user configurable and may be set either upon initial device setup, or at a later time via appropriate user interfaces provided by the cloud server 103. For example, a user may grant a friend access to the PAN for some limited purpose such as viewing photographs stored on one of the devices. The friend would be able to view allowed directories having the photographs based on the permissions that the user set for that friend's access. The cloud server 103 may also allow streaming media sessions between devices in the PAN. That is, one device may act as a "source" providing the streaming media and another device may act as a receiving device. The streaming media session is facilitated through a communication pathway provided by the cloud server 103. In this way, the user may use one device to access content on another device left as some remote location such as the user's home or office.

Figure 4:
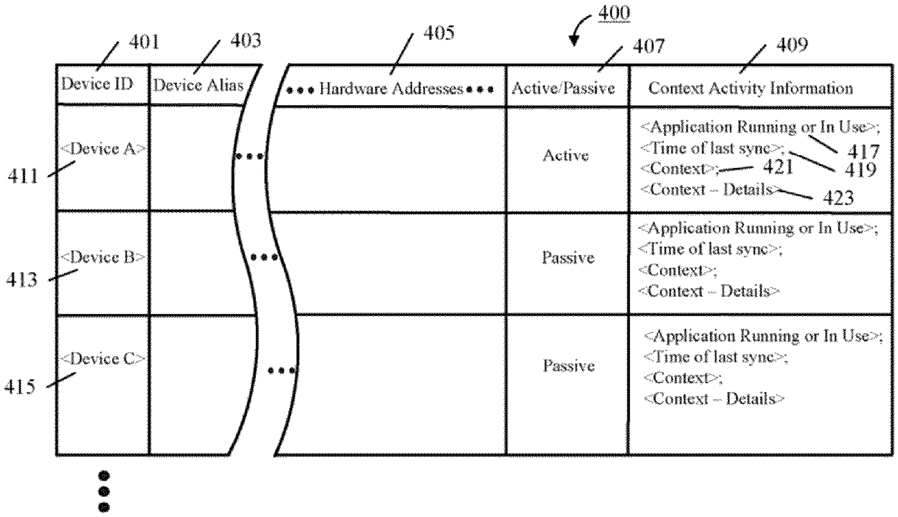
FIG. 4 is a diagram of a peer context table (also referred to herein as a "peer table") in accordance with an embodiment.

An example of the contents of a peer table 400 is provided in FIG. 4. The peer table 400 may contain some, or all, of the information contained in the device profile that each device initially sends to the cloud server 103. For example, for each device in the PAN the peer table 400 will include fields for the device ID as in column 401, fields for the peer or device alias as in column 403 (i.e. a user-friendly node name for the device), and fields for various hardware addresses (i.e. the peer Bluetooth™ hardware address, the peer WiFi hardware address, the peer MAC address, etc.) as in column 405. These hardware addresses are peer-to-peer connectivity information that devices may use to establish peer-to-peer connections with each other to access locally stored content. Although the example peer table 400 is shown in a column and row format, it is to be understood that the peer table may be arranged in any suitable fashion in accordance with the embodiments. Also, as discussed previously, the peer table may be partitioned into two or more database tables, for example, one table containing the device profile information, and another table containing the device context information. The example peer table 400 includes device information for three example devices "Device A," "Device B," and "Device C" as shown by the respective peer table 400 rows 411, 413 and 415. Additional rows are added to peer table 400 as the user adds devices to the PAN. The peer table 400 may also contain "status" information for the devices such as remaining battery power, location, or other information. However, such status information may be maintained separately by the cloud server rather than in the peer table.

In addition to the device profile information such as that shown in columns 401, 403 and 405, the peer table 400 will include an indication of whether each peer is in an active or de-active (passive) state, as shown by column 407. That is, column 407 indicates which peer is the current "context active" device. The context active device is the device that is either currently being used, or that was last used but is now in a passive or de-active state. The PAN can only have one context active device at any point in time. Also, as previously discussed above, if no peer table update is received from a device after a preset time out period, the context active device may then automatically be determined to be in a no-op state that is, de-active or otherwise in a passive state. In this example, the no-op state may apply to all devices in the PAN, until one of the devices engages in an active context state and begins to send context activity updates to the cloud server 103. In accordance with the embodiments, each device in the PAN uses the peer table 400 to determine how to interact with, and in some cases handoff context activity to, another peer device in the PAN.

To accomplish context activity handoffs between devices, the peer table also includes peer context activity information for each device in the PAN as shown in column 409. As discussed above, in some embodiments, the cloud server 103 and the PAN member devices may maintain a database that consists of two separate tables, a peer table and a peer context table which contains the context activity information related to each peer in the peer table. However, in the example currently described, a single peer table 400 is used to provide peer-to-peer connectivity information (such as hardware addresses and IDs, etc.) and also the peer context activity information. The peer context activity information includes a field 417 for indicating the "application running or in use" and a "time of last sync" field 419 that indicates when the peer last provided a context activity information update. This context activity information update may be made using a peer-to-peer wireless connection or via a wireless Internet connection to the cloud server 103 as was discussed with respect to FIG. 3.

A "context" field 421 indicates the context type that the user was engaged in such as, but not limited to, streaming media (such as listening to a radio station or watching a movie), media playback (i.e. audio, video or multimedia), telephony operations, Internet browsing, document editing, gaming, etc. A "context details" field 423 provides further information regarding the context type. For example, the context details may indicate the title of a movie that was being viewed, the time at which the movie was paused, the server that provided the movie content or a file path if the movie is stored locally on the device, or a link to a file stored on the cloud server. An example of "context details" for music may provide playlists, a specific song, playtime, pause position, local or remote access information, etc. An example of "context details" for a phone call may include call session details. An example of "context details" for Internet browsing may include a webpage address, resolution, and further context details. A radio station example of context details may include the station identifier, etc. As can be envisioned in view of the above description, various combinations of context details may be required in some circumstances. For example, an Internet browser may be used to watch a movie. In this case the context details may include the Internet browsing related context details and also the movie context details.

Put another way, the peer table 400 allows the passive devices 305, 311 of the PAN to determine the active device's 301 last activity and associated information such as the application type that the active device 301 was using, and may also include information about the specific content that the active device 301 was accessing. The peer table 400 also indicates the time of the last update received from the active device 301, i.e. the "Time of last sync" field 419. The cloud server 103 may also maintain a virtual map of the PAN devices that provides proximity information such as, but not limited to, the proximity of one device to another, geographic location (such as "home," "office," or other which may be determined by user settings) and whether each device is in communication range of other devices.

Returning to FIG. 2, the service module present on each peer performs various activities related to, and enabled by, the peer table 400. Each service module runs as a background service on its respective device and monitors for context activity changes on the respective device. The service module may also monitor device status such as, but not limited to, battery power level, proximity to other devices, geographic location change, etc. The service module may also perform call forwarding to another peer based on the addresses mapped in the peer table 400. The service module also facilitates peer-to-peer communication without the need for extra authentication when the peer device user ID matches the peer user ID in the peer table 400. The service module may be switched on or off by the user from the device's profile settings.

In accordance with the embodiments, devices that are members of the PAN may perform context handoffs from one peer device to another. Context handoffs may be based on a number of factors such as, but not limited to, a device power profile including the device battery level, location, the current context activity running on the device, etc. The context handoffs may be controlled by user provided profile settings that the user may provide at the time of adding a device to the PAN, or later via a user interface, such as a web-based profile center.

That is, the NaaS cloud based PAN service 101 provides a web-based profile center for the user. A device user may use any device to log in to the web-based profile center via cloud server 103, and a web user interface, and make profile changes for each device, or provide settings for overall PAN operation based on context activity changes. In some embodiments, the user can also access the content of each device from the web-based user interface. After the user makes various changes to device profiles and settings, the changes are propagated to the PAN member devices via the Internet or, via an indirect connection using a peer-to-peer connection, or update.

Figure 5:
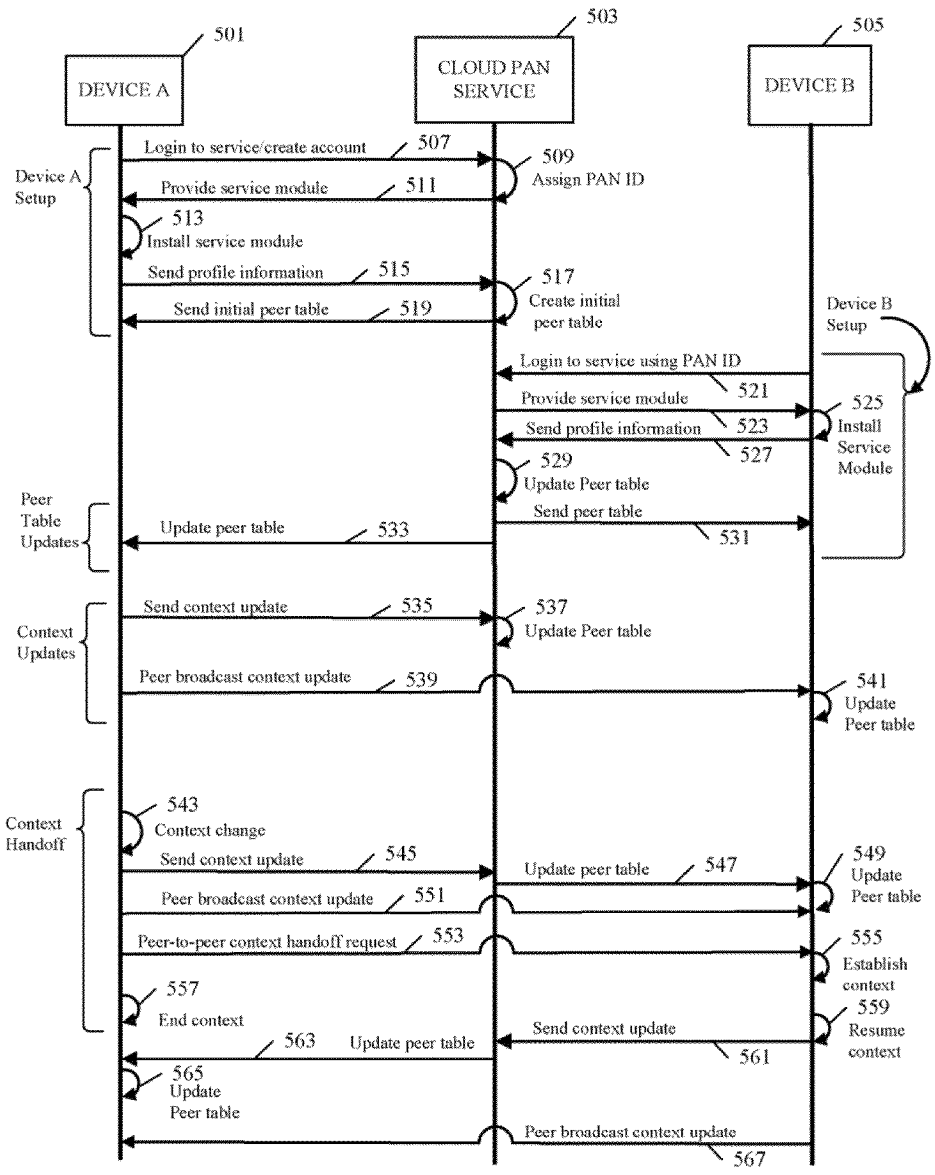
FIG. 5 is a message flow diagram or operation flow diagram illustrating methods of operation of a cloud based PAN service in accordance with some embodiments.

The message flow diagram of FIG. 5 provides details of operations of some embodiments for device setup, peer table updating, context activity updates and context handoff methods of operation. For clarity, FIG. 5 is limited to two devices, "device A" 501 and "device B" 505. One method of operation for setting up device A 501, begins when the user accesses device A 501 and logs in to cloud PAN service 503 to create an account as shown by 507. The cloud PAN service 503 assigns a PAN identifier, i.e. a user login ID, as shown by 509. The cloud PAN service 503 provides a service module at 511 to device A 501 that device A 501 installs at 513. Device A 501 may then send profile information 515 to the cloud PAN service. The cloud PAN service 503 creates an initial peer table 517 using the device A profile information 515. The initial peer table is then sent to device A 501 at 519 as shown. Device A 501 is then associated with a PAN that corresponds to the assigned PAN ID (i.e. the user ID). Additional devices may then be added to the PAN.

A method of operation for adding a second device, i.e., device B 505 to the newly established PAN, is also shown in FIG. 5. First, at 521, the user accesses device B 505 and logs in to the cloud PAN service 503 using the same PAN ID that was assigned to device A 501. The cloud PAN service 503 provides a service module as shown at 523, and device B 505 installs the service module as shown at 525. Device B 505 then sends its profile information to the cloud PAN service 503 as shown at 527. At this time, the cloud PAN service 503 must update the peer table at 529 to include device B 505. The cloud PAN service 503 then sends the peer table to device B 505 as shown at 531. This peer table will include information for device A 501, such that device B 505 may establish a peer-to-peer connection with device A 501 at any appropriate time. The peer table will also include context information about device A 501. The cloud PAN service 503, having received information about device B 505, also sends a peer table update to device A 501 as shown at 533. The peer table update may be accomplished in a variety of ways in accordance with the embodiments. For example, the cloud PAN service 503 may send device A 501 only the new information regarding device B 505, may replace the device A 501 peer table with a new updated peer table, or may use some other database management techniques to ensure that device A 501, and also device B 505, have the latest peer table information.

The devices in the PAN, also provide context activity updates to the cloud PAN service 503 and/or to each other via broadcast messages. For example, device A 501 may send a context activity update 535 to the cloud PAN service 503 which then updates the peer table at 537 accordingly. Device A 501 may also send a broadcast context activity update 539 to all peers in the PAN, such as device B 505. Device B 505 then updates its local copy of the peer table as shown at 541. Otherwise, device B 505 will obtain the peer table update from the cloud PAN service 503.

After having established at least two devices in the PAN using the cloud PAN service 503, the devices will monitor the peer table for context changes of the context active peer and may engage in context handoffs automatically according to user preference settings, or via direction of the cloud PAN service 503. For example, device A 501 may be the context active peer, that is, the device currently being used to access content or for some other current activity. Device B 505 will then be shown as "passive" in the peer table. If device A 501 has a context change 543, device A 501 will send the cloud PAN service 503 a context activity update 545 and may also send a peer broadcast context activity update 551 that may be received by device B 505. The cloud PAN service 503 will send a peer table update 547 to device B 505, which will accordingly update its local copy of the peer table as shown at 549. If the peer table update 547 is not received, then device B 505 may update its local peer table based on the peer broadcast context activity update 551.

FIG. 5 also provides details of how a context handoff may proceed between two peer devices of the PAN. For example, in some embodiments, device A 501 may send device B 505 a peer-to-peer context handoff request 553. In response, device B 505 may establish the required context as shown at 555, thereby taking over the action of device A 501. Device A 501 may then end its context operation as shown at 557, and device B 505 may resume the context operation at 559. Device B 505 will also send a context activity update 561 to the cloud PAN service 503, and may also broadcast a context activity update 567 to its peers. Device A 501 may receive a peer table update 563 from the cloud PAN service 503 and accordingly update its local peer table as shown at 565. Otherwise, device A 501 may receive the peer table update by way of the peer broadcast context activity update 567.

Although the above described example included a peer-to-peer context handoff request 553, this request is not necessary in all embodiments. That is, for some embodiments, the context handoff may be controlled by settings maintained by the cloud PAN service 503 and may occur automatically without any requests being sent. The cloud PAN service 503 may alternatively send the request to an appropriate device (i.e. server directed context handoff). In other embodiments, the next device that the user "activates" may automatically take over the context activity based on the information provided in the peer table. Prompts may be provided for context handoffs as will be described below with respect to FIG. 6 and FIG. 7. As can be envisioned by one of ordinary skill, in view of the description provided herein, many advantageous use case scenarios can be realized by the NaaS cloud based PAN service of the embodiments.

Some examples of the various advantageous use case scenarios that are enabled by the NaaS cloud based PAN service in accordance with the embodiments will now be described. In a first example use case scenario, a user may seamlessly handoff their multimedia experience (i.e. perform a context handoff) from one peer device to another peer device on the go. If the user is listening to a news program in his or her living room television and subsequently ventures out of the house, a mobile device can become the context active device and begin streaming the news program. Later, if the user then goes inside their car, the car radio which has Internet capability may begin to stream the news program as audio and the mobile device streaming will be shut off. In other words, the user never has to take any action on the device, because the context handoffs will occur automatically based on the service modules of each device detecting the context, and then taking action based on the user's context settings using the peer table 400. The user does not need to start and stop applications on mobile devices or to turn to a specific channel or radio station because the devices are able to act based on the peer table and also, in some embodiments, user settings made in the NaaS cloud based PAN service 101.

As shown in FIG. 5, and in view of the above example, the television must include the service module in accordance with the embodiments. The service module, and also the NaaS cloud based PAN service 101, may access the peer table to determine which device is context active. That is, after the user turns off the television, the peer table entry for the television will change from "context active," to "passive" or "deactivated." Accordingly, the NaaS cloud based PAN service 101 will receive a context activity update, and other devices in the PAN will receive either or both of peer table updates from the NaaS cloud based PAN service 101 or a peer broadcast context activity update. In some embodiments, a peer-to-peer context handoff request may be sent based on user settings. In other embodiments, the NaaS cloud based PAN service 101 or the context active device will take over the context action based on the peer table indication that the previous context active device is now passive, and based on the latest time of update information.

Figure 6:
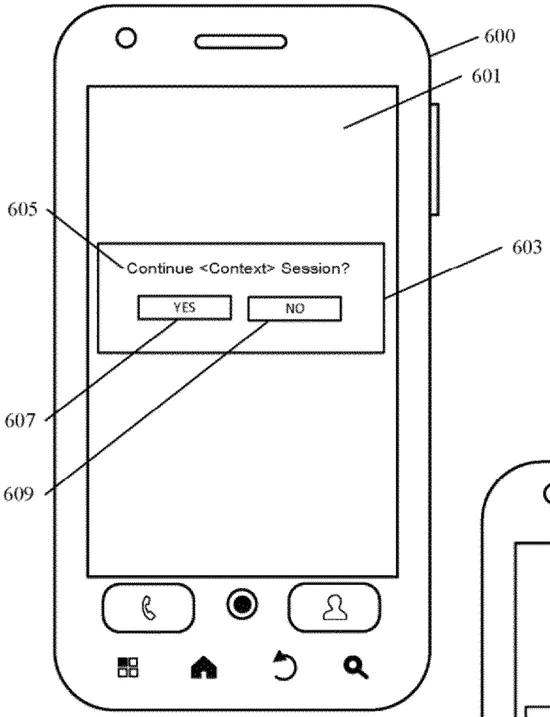
FIG. 6 is a diagram of a user interface for providing a prompt to the user of a currently "active" device. The prompt asks the user if a context session from the previous active device should be continued, in accordance with various embodiments.

In some embodiments, as shown in FIG. 6, the service module of the new context active device (such as device 600) will provide a popup box 603 on the context active device 600 display 601. The popup box 603 asks the user whether he or she wishes to continue the context session from the previous context active device by a "Continue <Context> Session?" question 605. The user may then select a "YES" button 607 or a "NO" button 609. The "<Context>" field of the question 605 may be populated using information from the peer table. That is, the "<Context>" may be "browsing," "video," "audio," "editing," etc. For example the question 605 may ask the user if he or she wants to "Continue Video Session?" The user may then select the YES button 607 to continue viewing the video on device 600. In other words, the context active device may take over where the previous context active device left off, so that the user can continue to participate in the context session on the different device.

In a second example use case scenario, a user may be listening to a music track on a sound system in the house and then move outside. As the user moves outside his house a music application running on the home sound system will stop and a music application on the user's mobile device (being carried along) will launch automatically and continue music playback of the same track from exactly the same point. In other words, the overall user experience while listening to music is seamless due to the context awareness of the various devices in the cloud based PAN. That is, the context activity follows the user.

In a third example use case scenario, the user may be browsing through the webpages of a social network using a mobile device in her living room. As she clicks on a video clip or a picture posted by her friend, the video clip or picture will be displayed on the television instead of the mobile device to take advantage of the television's larger display size. In accordance with the embodiments, the above example can be facilitated by user settings.

In a fourth example, a user may want to share content, such as photographs, with his friend. The user may add his friend's PAN service ID to his PAN with specific permission setting to allow access to the shared files. The user's friend can then access the files either peer-to-peer or via the cloud based PAN service.

A fifth example use case scenario involves a baton-passing mechanism which may be followed in a multi-player social gaming environment. Any individual player can pass on his role playing to another player similar to passing a baton in a relay race. An individual player can give a temporary pass to another player to enter his cloud based PAN. In this way, the player can pass on the game role-playing to his friend without handing over his phone or his console controller. A similar approach may also be used between devices of the PAN for the same player. That is, if the user is playing a game on his smartphone device and the battery runs low, the user may switch the gaming context to another device and continue the same game.

A sixth example use case scenario involves user device level authentication. Most devices provide for password authentication and thereby lock the device (i.e. the user interface) from access until a valid password is entered. In some embodiments, a user does not have to perform this authentication step on devices that are in proximity to a context active device. That is, if the user is already carrying and using a peer device, the other peers in proximity may automatically allow user interface access based on proximity of the context active device, location and appropriate user settings. User settings may allow or prevent peer devices from granting access at inappropriate locations, such as in an office environment, where the user would not want computer or laptop access to occur based on his smartphone or other portable device proximity. However, the user may want to allow devices located in his or her home to authenticate for user interface access based on the user walking into their home with a context active device, such as a smartphone. The location information is obtained by the service module and may include GPS location data or any other appropriate location information that enables a peer device to determine locations, for example, home, office, etc. Additionally, the various peer devices may have different profile settings based on the various environments. For example, context handoffs may be allowed at home or at the office, but not elsewhere. The various devices may have proximity sensors that enable detection of short range proximity between devices instead of, or in addition to using GPS or other location coordinates. For example the devices may employ near field communication (NFC) technology. Alternatively, the peer-to-peer transceivers may serve to ping other nearby devices to determine proximity provided that user settings allow activation based on RF communication ranges (which may be unacceptably large ranges).

Telephony features such as call forwarding may also be automatically facilitated by the various embodiments. For example, the calls directed to any device in the cloud based PAN may be redirected to the context active device. Because the peer table (or a separate data table) may include status information such as power levels of the peer devices, calls may also be forwarded based on the power/battery level of the devices. Likewise, the peer table information may be used to prevent calls from being forwarded to devices having a low battery level to prevent the call from being forwarded to a device that may soon turn off due to the low battery.

The cloud based PAN service, in some embodiments, maintains a virtual peer map. The virtual peer map provides location and/or other information related to the reachability or proximity of each peer device from the context active device. Therefore, for example, if a phone call is to be forwarded, the virtual peer map can be used to determine whether peer devices are accessible via peer-to-peer communication, by an Internet connection to the cloud based PAN service, or both, and make an appropriate selection. The virtual peer map may be facilitated by the use of NFC technology integrated into the devices for proximity detection as discussed above.

In accordance with the embodiments, a user may also define sub-networks with the PAN that may be based on various criteria such as, but not limited to, location. For example the user may define a work, home, entertainment, etc. sub-network and assign only some of the PAN devices to the sub-network. As would be understood, some devices may overlap in that they may be part of more than one sub-network.

Figure 7:
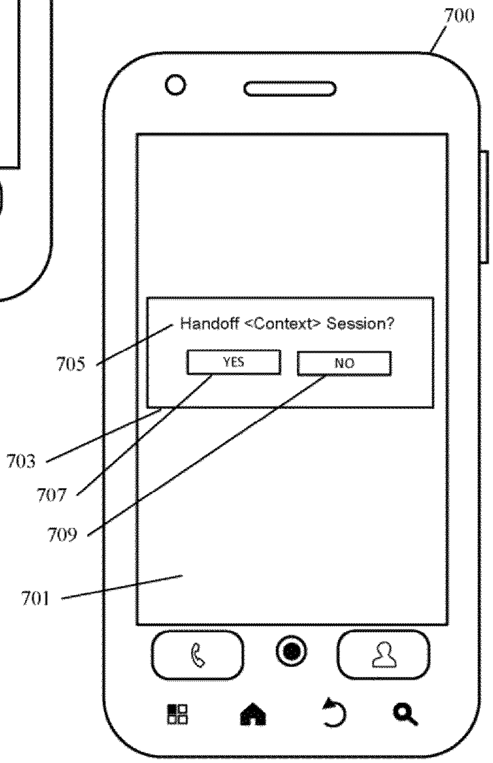
FIG. 7 is a diagram of a user interface for providing a prompt to the user of an active device, when a context session is being shut down, or when the device is being shut down. The prompt asks the user if the context session being shut down should be continued by handoff of the context session to another device, in accordance with various embodiments.

FIG. 7 illustrates a device 700 displaying popup box 703 on display 701 in response to shutting down a context session, or shutting down, device 700. The popup box 703 asks the user whether he or she wishes to handoff the context session to another peer device by a "Handoff <Context> Session?" question 705. The user may then select a "YES" button 707 or a "NO" button 709. The "<Context>" field of the question 705 may be populated using information from the peer table. That is, the "<Context>" may be "browsing," "video," "audio," "editing," etc. For example the question 705 may ask the user if he or she wants to "Handoff Video Session?" The user may then select the YES button 707 which then may initiate sending a peer-to-peer context handoff request. This request may be a broadcast message or may be directed to a specific peer based on the peer table. If the user selects the NO button 709, the context session and/or the device will be shut down with no further action. When the user picks up the next peer device, that device becomes context active and may display the popup box 603 illustrated in FIG. 6.

Figure 8:
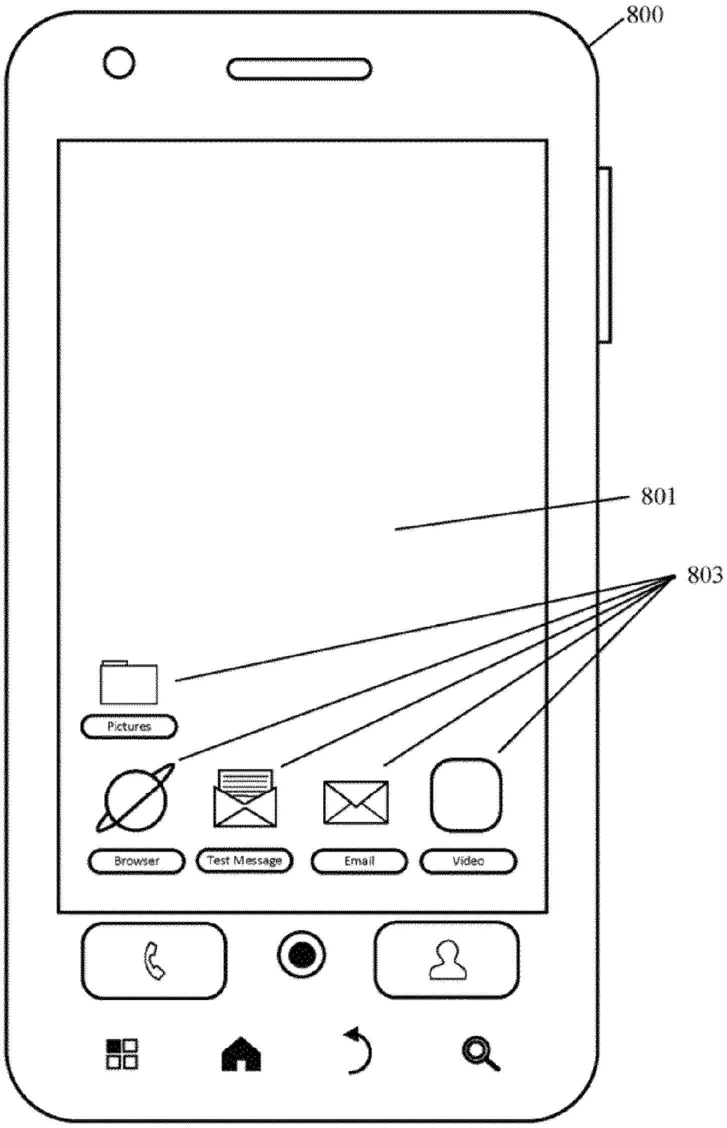
FIG. 8 illustrates a user interface of an embodiment in which a lock screen or login screen of a "passive" device shows the application state (i.e. the applications being run) of the "active" device (i.e. the device currently in use) and enables context handoff by receiving user selection input of an application icon. Upon selection of an application icon the passive device will open and run to the appropriate application to continue a context session activity from the previous context active device. That is, the passive device will take over the role of the active device and will, at that point, be designated as the active device in the peer table.
Figure 9:
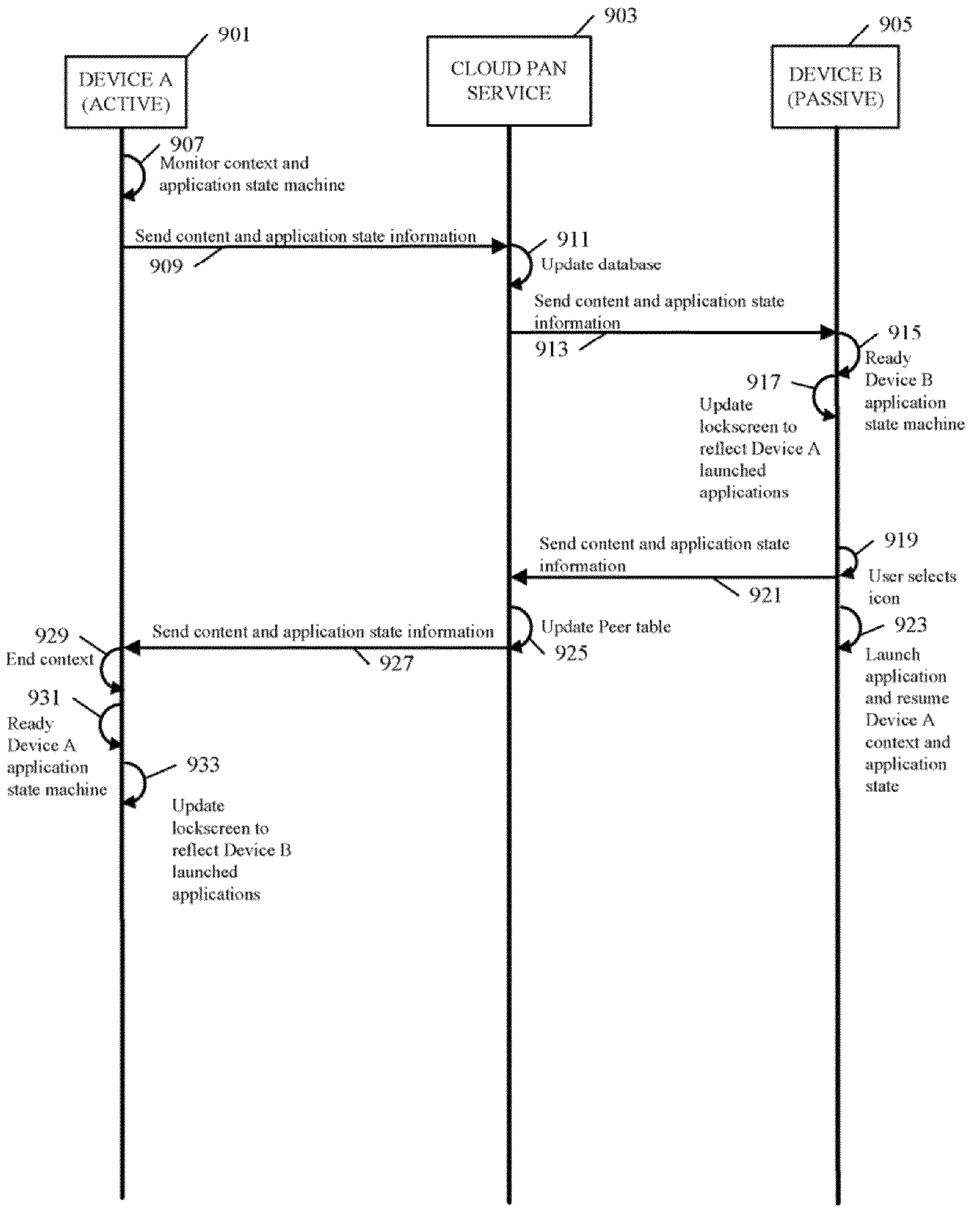
FIG. 9 is a message flow diagram illustrating methods of operation corresponding to the user interface shown in FIG. 8, according to some embodiments.

FIG. 8 and FIG. 9 provide an alternative to the prompt illustrated in FIG. 6. FIG. 8 is a diagram of a graphical user interface (GUI) with application icons 803 that enable a user to directly open and go to the appropriate application to continue a context session activity from a previous context active device. The user does not have to enter any login information to bypass the device 800 lockscreen. That is, the device self-authenticates the user based on the user ID stored at the cloud server and based on user preferences for device proximity activation. The display 801 shows application icons 803 that correspond to applications currently being run on the active device. That is, the device 800 display 801 mirrors the application state of the context active device. Rather than having to unlock the lockscreen of device 800, the user may select any of the displayed application icons 803 to launch a desired application and resume the context activity of the previous active device. The display 801 is initially activated when the device wakes up from sleep mode. For example, the user may press a button on the device or touch a touch screen to bring up the display 801 which may have been blank during device 800 sleep mode or where some other screen saver may have been running, possibly as a lockscreen requiring a password.

The device 800 is aware of the context activity of the previous context active device via the device 800 local copy of the peer table. Additionally, the device 800 runs a portion or all of an application software stack so that the device 800 is in a ready state to resume the context activity. That is, the application icons 803 correspond to the device 800 mirroring the application state machine of the active device for any application running on the active device. The service module of device 800 uses the peer table and application state machine information of the active device to reconfigure the display 801 to show an application icon appropriate for a current context activity being run on the context active device. It is to be understood that this may occur in the lockscreen mode, but may also occur for an initial login screen. That is, upon power up and boot up of device 800, the device 800 service module may access the cloud server to obtain the most recent peer table and application state machine information and reconfigure the login screen on display 801 accordingly. The term "lockscreen" as used herein refers to a type of login screen that is used to secure a device that has already been powered up by the user. In usual operation, the user must enter a password into the lockscreen to access the device, similar to the operation of an initial login screen. The embodiments enable the user to go directly from a lockscreen to an application that is, or was, running on another device.

The message flow diagram (or operation flow diagram) of FIG. 9 provides details of the methods of operations related to display of the GUI shown in FIG. 8. Although FIG. 9 illustrates methods of operations for two devices for simplicity of explanation, multiple passive devices may operate in a similar manner to passive device B 905 at the same time so that any of the passive devices may be used to resume the context activity. An active device A 901 monitors its context activity and any associated application state machines as shown by operation 907. Device A 901 then sends message 909 to the cloud PAN service 903 containing content and application state information. The cloud PAN service 903 updates its database in operation 911 and sends the content and application state information via message 913 to the passive device B 905. The passive device B makes ready its own application state machine at operation 915 by running a portion or all of the same application software stack as device A 901. The device B 905 lock screen is updated at operation 917 to reflect any applications launched by device A 901

If a user selects an application icon on the GUI of device B 905 as shown by operation 919, device B 905 sends message 921 containing content and application state information to the cloud PAN service 903 which accordingly updates the peer table in operation 925. In response to the user's application icon selection at operation 919, device B 905 launches the appropriate application at operation 923 and resumes the context and application state that device A 901 was previously engaged in.

After cloud PAN service 903 updates the peer table in operation 925, it sends content and application state information from device B 905 to device A 901 in message 927. Device A 901 may then end the context as shown in operation 929 and may make ready its application state machine in operation 931. Device A 901 now assumes the role of a passive device and in operation 933 it updates its lock screen to reflect any applications launched by device B 905.

Figure 10:
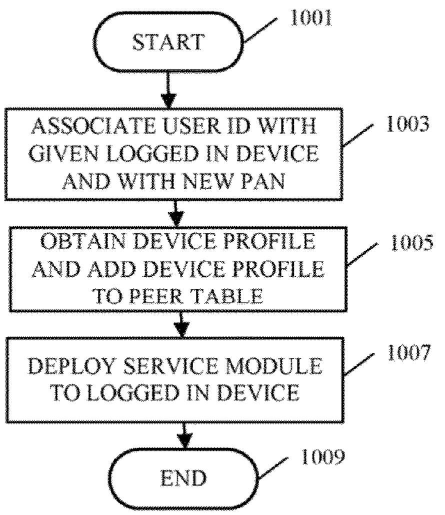
FIG. 10 is a flow chart showing a method of operation of a cloud based PAN service in accordance with various embodiments.

FIG. 10 is a flow chart showing operation of a cloud based PAN service in accordance with various embodiments. A method of operation begins at block 1001 as shown. In 1003, a user logs into to a cloud server using a given device and a user ID. The cloud server associates or maps the user ID to a PAN and associates the given logged in device with the PAN and the user ID. For example, the user ID may be a Google ID in some embodiments. In 1005, the cloud server obtains a device profile from the logged in device, and adds the device profile information to a peer table. In 1007, a service module is deployed to the logged in device, which the device may then install. The method of operation ends in 1009. The service module may be deployed in various ways in accordance with the embodiments using any suitable mechanism, such as, but not limited to, client pull (were the device acts as a "client"), server push, downloading, etc. That is, the service module may be implemented as executable instructions, (i.e. software or firmware "code"), that may be executed by one or more processors to perform the functions and features described herein with respect to the service module.

Figure 11:
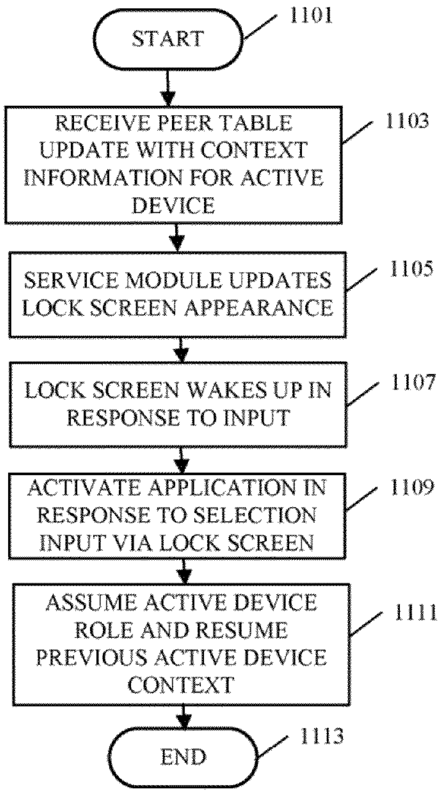
FIG. 11 is a flow chart showing a method of operation of a PAN node, such as a mobile communication device or other electronic device, during a context handoff in accordance with various embodiments.

FIG. 11 is a flow chart showing operation of a PAN node, such as a mobile communication device or other electronic device, during a context handoff in accordance with various embodiments. The method of operation begins in block 1101 as shown. In 1103, the device receives a peer table update with context information for the current context active device in the PAN. In 1105, the service module of the device updates the lock screen appearance of the device to correspond to a configuration similar to the example shown if FIG. 8. In 1107, the user may "wake" the device by providing an input such as, but not limited to, moving the device and activating a motion sensor or gyroscopic sensor, gesturing such that a sensor picks up the user's gesture action, pressing a button on a keypad, activating a touch screen, etc. In response, the lock screen of the device which is similar to the example shown in FIG. 8 is displayed. In 1109, the user may activate an application by providing selection input through the lock screen GUI, such as selecting an application icon. The appropriate application will be launched and activated by the device service module in response to the user selection input. The user may select an application icon as shown in FIG. 8 or, alternatively, may respond to a prompt to continue as shown in FIG. 6. In 1111, the device assumes the role of "context active" for the PAN, and resumes the context of the previously context active device. The method of operation ends as shown in block 1113.

Figure 12:
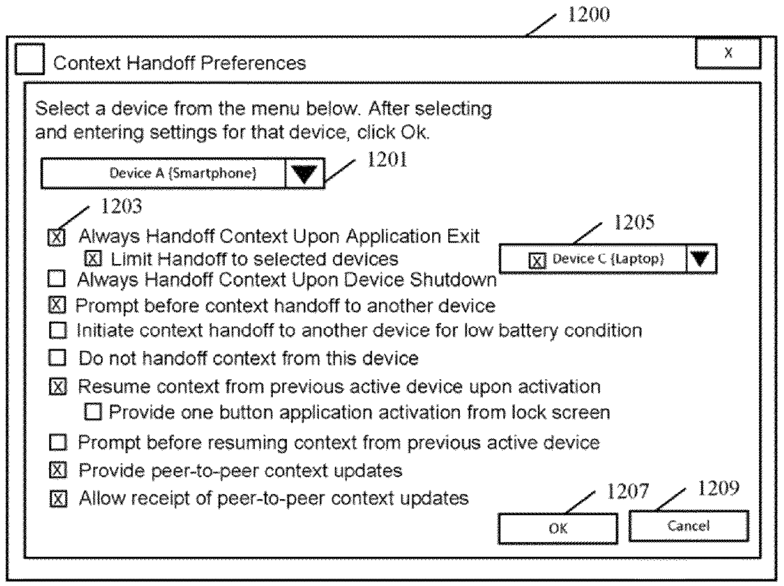
FIG. 12 is a diagram of a graphical user interface (GUI) screen of a Web based profile center that enables a user to enter context handoff preferences and other device profile settings and preferences in accordance with an embodiment.

FIG. 12 is a diagram of a user interface screen 1200 representing a portion of a graphical user interface (GUI) of a Web based profile center, that enables a user to enter context handoff preferences and other device profile settings and preferences in accordance with some embodiments. As discussed previously herein above, a cloud server of the cloud based PAN service may provide the Web based profile center when a user logs in to the service using any device that was previously associated with the PAN, or with a device to be newly associated with the PAN. An example user interface screen 1200 of the Web based profile center allows the user to select a PAN device via a pull-down menu 1201. After selecting the desired device, a series of checkboxes 1203, menus, etc., may be provided that allow the user to makes entry selections for the selected device. The user may select an "OK" button 1207 to apply the settings or select a "Cancel" button 1209 to stop or to select a different device from the pull-down menu 1201. The cloud server may then propagate the changes, or appropriate portions of the changes, as needed to the service modules of the various PAN devices. The service module of the various devices may also be accessible in some embodiments via the user interface screen 1200, or a suitable similar user interface screen may be provided on each corresponding device that allows setting and preferences updates for that device. In this case, the service module saves any changes and propagates the changes to the cloud server which may, in turn, propagate the changes to other devices of the PAN.

It is to be understood that the user interface screen 1200 is an example only, and is not to be construed as limiting in any way the type of user interface provided by the cloud server or service modules. Many other suitable different arrangements of user interface that allow entry of settings and preferences may be used that look different from the example user interface screen 1200, and any such different arrangements remain contemplated by, and within, the scope of the various embodiments herein disclosed.

In the example of FIG. 12, a user selected "Device A" which is a smartphone, by using the pull-down menu 1201. The user then selected various checkboxes related to how the device will engage in context handoffs with other devices in the PAN. For example, the user selected the checkbox for "Always Handoff Context Upon Application Exit." In this example, the peer table of the cloud server and at the local level of each device will indicate when device A is no longer context active and will also receive an update from device A when the active application is shut down. Because of the selected preference, which will have a corresponding indication in the peer table, the next device that is awaken should take over the previous context activity and launch the appropriate application for that purpose. In the FIG. 12 example, the user also selected a checkbox for "Limit Handoff to selected devices." Selecting this checkbox activates the pull-down menu 1205 which enables the user to specify the appropriate devices. Further details of the pull-down menu 1205 are shown in FIG. 13.

Figure 13:
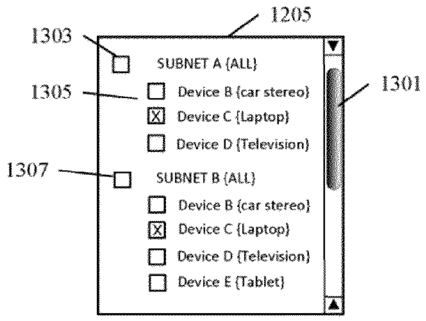
FIG. 13 is diagram of a portion of the user interface screen shown in FIG. 12, where a user may select specific devices for allowing context handoff operation in accordance with an embodiment.

As shown in FIG. 13, the user may have setup various subnets such as subnet A and subnet B by using the cloud based PAN service. The two subnets include subsets of the devices associated with the user's PAN. A checkbox 1303 allows the user to select all devices associated with subnet A (i.e. device B, device C, and device D). Alternatively, the user may select a single device using device checkboxes 1305, such as device C, which is shown selected in the example. Selecting device C under subnet A, will automatically select device C under subnet B, since it is the same device in both subnets. The user may also have selected the checkbox 1307 for subnet B which would have automatically selected all devices in subnet B and subnet A since the subnet A devices overlap with subnet B. Subnet B however has the additional device E which is a tablet. The user may use scrollbar 1301 to scroll to other devices in the PAN and/or other defined subnets.

Returning to the example of FIG. 12, the checkbox for "Prompt before context handoff to another device" is shown selected. This checkbox would result in the display of FIG. 7 being shown to the user prior to initiating the context handoff to another device. Otherwise, the system would perform context handoffs based on the "active device" recorded in the peer table as the default setting. The checkbox "Resume context from previous active device upon activation" would result in the screen similar to FIG. 8 being shown to the user, but would not provide the prompt of FIG. 6. In other words, when the next active device is device A, the smartphone, (i.e. the device in pull-down menu 1201 corresponding to the checkbox setting), device A would automatically resume the context activity of the prior device without prompting the user as in FIG. 6. Other checkboxes shown in FIG. 12 are self-explanatory in view of the explanations provided above. It is to be understood that various other checkboxes or menus could also be provided for selecting other preferences or settings in various combinations and that such other features may become apparent to those of ordinary skill in light of the above disclosure and description.

Figure 14:
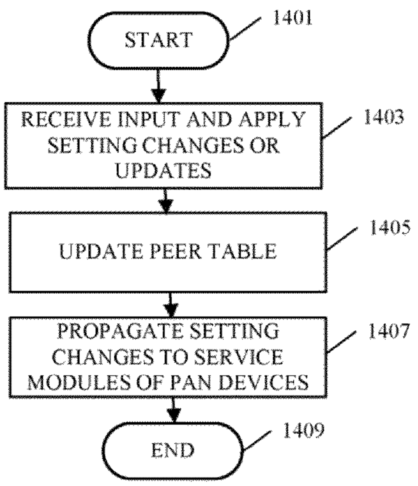
FIG. 14 is a flow chart showing a method of operation of a cloud based PAN service in accordance with an embodiment.

FIG. 14 is a flow chart showing a method of operation of a cloud based PAN service in accordance with an embodiment. The method of operation begins in block 1401. In 1403, at least one cloud server receives input for setting changes or updates. In 1405, the at least one cloud server updates the peer table. The cloud server may then propagate the setting changes to the service modules of the PAN devices as shown in 1407. The setting changes may be sent by way of peer table updates. The method of operation ends in block 1409 as shown.

Figure 15:
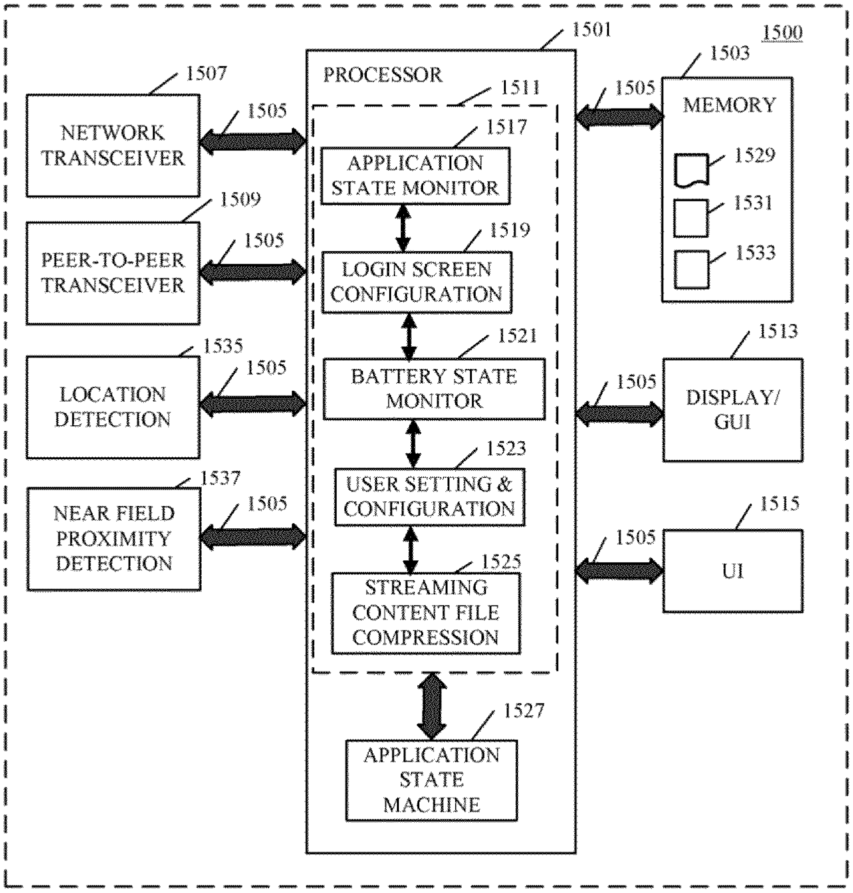
FIG. 15 is a partial schematic block diagram of a mobile communication device in accordance with an embodiment.

FIG. 15 provides a partial schematic block diagram of a device 1500 which is an apparatus in accordance with various embodiments. FIG. 15 provides an example for the purpose of describing to those of ordinary skill how to make and use the various embodiments. Therefore FIG. 15 is a partial schematic block diagram in that it is limited to showing only those components necessary to describe the features and advantages of the various embodiments to those of ordinary skill. It is to be understood that various other components, circuitry, and devices may be necessary in order to implement a complete functional apparatus (such as a mobile communication device) and that those various other components, circuitry, devices, etc., are understood to be present by those of ordinary skill.

The device 1500 is an apparatus in accordance with an embodiment and may be a mobile communication device or some other electronic device. That is, the device 1500 may be a network device in a system in accordance with an embodiment. An internal communication bus 1505 provides operative coupling between various components, at least one processor 1501 and a display 1513 which provides a GUI. The communication bus 1505 may run throughout the device 1500 providing operative coupling between any of the various components, circuitry, and the like, contained therein. The communication bus 1505 provides operative coupling in that various intervening device components, circuitry, and the like, may exist in between, and/or along, the communication path between any two or more operatively coupled components, etc. As shown in FIG. 15, the processor 1501 is operatively coupled by the communication bus 1505 to memory 1503, user interface (UI) 1515, display 1513, network transceiver 1507, peer-to-peer transceiver 1509, location detection 1535 and near field proximity detection 1537.

The network transceiver provides wireless communication capabilities for one or more wide area network communications systems such as, but not limited to, 3G or 4G wireless communications systems. The peer-to-peer transceiver 1509 provides wireless connectivity capabilities such as, but not limited to, Bluetooth™, Wireless USB, ZigBee, or other technologies, etc. Location detection 1535 provides location coordinate information to the processor 1501 and may be any suitable location detection hardware such as, but not limited to GPS, etc. The near field proximity detection 1537 allows close proximity detection of other devices using any suitable near field transponder or other technology, etc.

The UI 1515 may include a track ball mouse, touch sensitive elements, physical switches, gyroscopic position sensors, etc. The display/GUI 1513 may include touchscreen functionality and is operative to receive command and control signals from the UI 1515 directly, or via the processor 1501, for functions such as, but not limited to, mouse cursor control click to provide selection input and or drag and drop features or other functionality.

The memory 1503 is a non-volatile, non-transitory memory, and stores a local peer table 1529, user settings and configuration information 1531 and application state machine information 1533. The processor 1501 is operative to run a service module 1511 in accordance with the embodiments which may require executing executable instructions (i.e. code) stored in memory 1503. However, the service module 1511 and any of its component modules may be implemented independently as software and/or firmware executing on one or more programmable processors (including CPUs and/or GPUs), and may also include ASICs, DSPs, hardwired circuitry (logic circuitry), or combinations thereof, and are not limited to executable instructions as an implementation. In such hardware implementations the cloud server need only obtain the device profile and possibly provide specific authorization information to a respective device service module, or may provide some user, device or network specific software or firmware, etc., instead of providing the entirety of the service module to a device. The processor 1501 is also operative to run and manage at least one application state machine 1527 which corresponds to an application (not shown) being run on the processor 1501 along with the service module 1511.

The various embodiments also include non-volatile, non-transitory computer readable memory, other than memory 1503, that may contain executable instructions, for execution by at least one processor, that when executed, cause the at least one processor to operate in accordance with the service module 1511 functionality herein described. The computer readable memory may be any suitable non-volatile, non-transitory, memory such as, but not limited to, programmable chips such as EEPROMS, flash ROM (thumb drives), compact discs (CDs) digital video disks (DVDs), etc., that may be used to load executable instructions or program code to other processing devices or electronic devices such as those that may benefit from the features of the herein described embodiments.

The service module 1511 may consist of various component modules such as application state monitor 1517, login screen configuration 1519, battery state monitor 1521, user setting and configuration 1523 and streaming content file compression 1525. Each of these modules are operatively coupled to each other and are operative to provide information and/or command and control signals to each other as needed.

For example, the application state monitor 1517 module may receive application state information from an active device via network transceiver 1507 or peer-to-peer transceiver 1509, and may provide this information to the login screen configuration 1519 module which further sends data to the display/GUI 1513 to display associated application icons. The application state monitor 1517 is also operative to monitor application state machine 1527 and send application state information to the cloud server component via the network transceiver 1507. The application state monitor 1517 does this whenever the device 1500 assumes the role of context active device on the network. FIG. 9 which was discussed above illustrates the operations carried out by the application state monitor 1517 and the battery state monitor 1521 for both an active device and a passive device scenario.

The user setting and configuration 1523 module enables the user to enter settings and configuration information that is stored in settings and configuration information 1531 and that is also sent to the cloud server component. The settings and configuration information 1531 may be used to determine how context handoffs are handled between device 1500 and other devices in the defined network.

Figure 16:
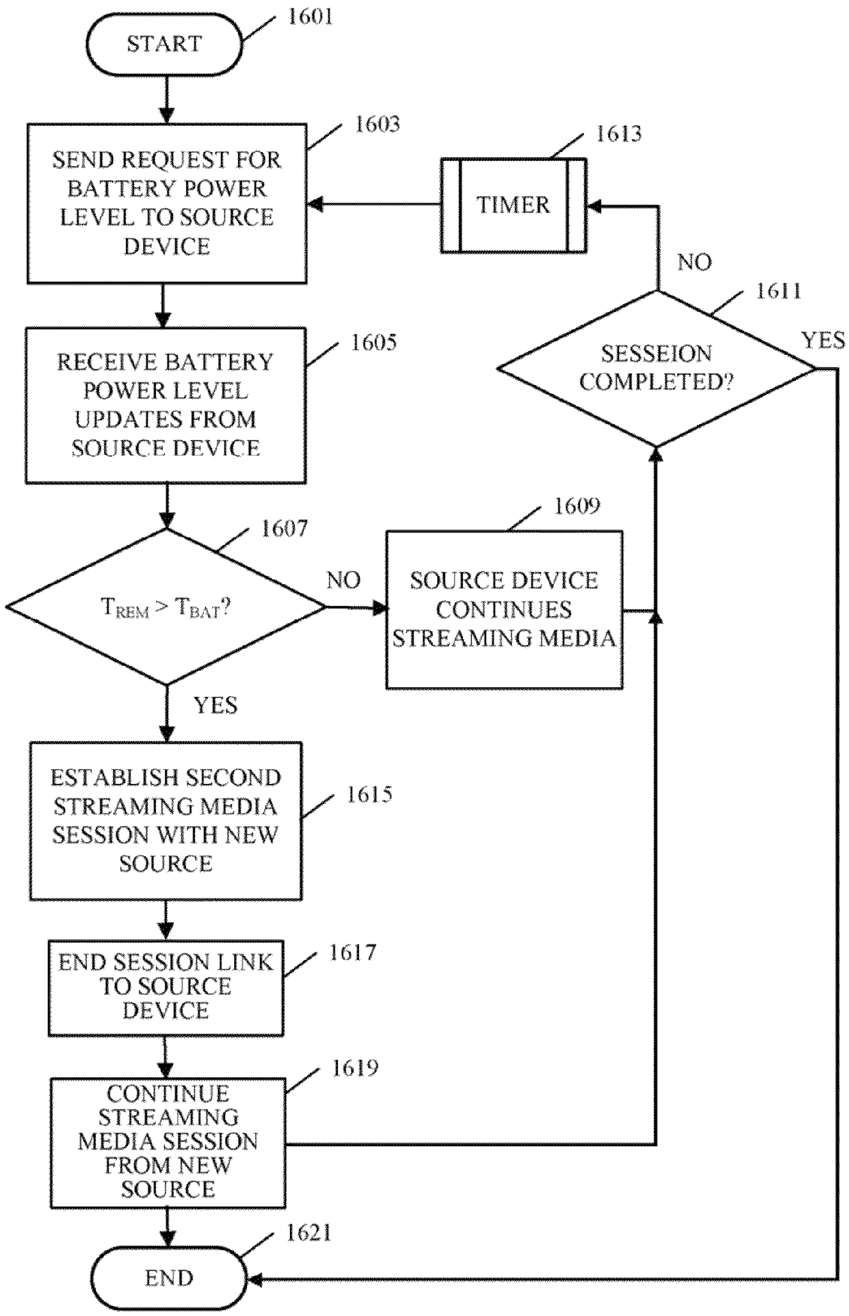
FIG. 16 is a flowchart of a method of operation of a server component for handling streaming media in accordance with an embodiment.
Figure 17:
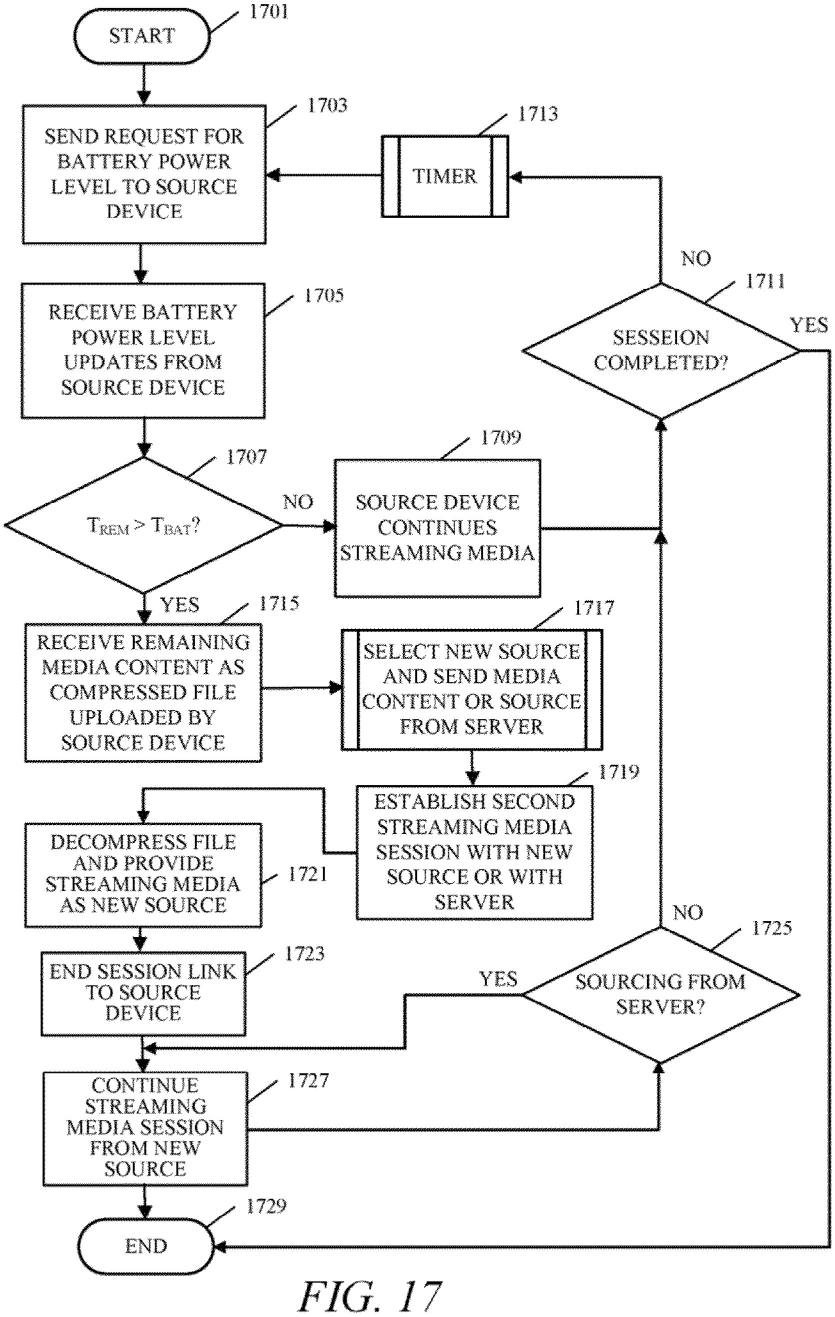
FIG. 17 is a flowchart of a method of operation of a server component for handling streaming media where the server component receives a compressed file containing a remaining portion of media content from a source engaged in a streaming media session in accordance with an embodiment.

Further details of methods of operation of the service module 1511, the battery state monitor 1521 and the streaming content file compression 1525 module are provided in the flowcharts of FIG. 16 and FIG. 17. Referring to FIG. 2, two network devices may establish a streaming media session with one of the devices assuming the role of source and the other device assuming the role of receiving device. Initially, using device A 201, a user may view a directory of content available on device B 209 via a network connection through the cloud server 103. The cloud server 103 intermediates the connectivity between devices per the peer table information and the service modules of the two devices and enables connections between authorized devices that are designated as part of the cloud based PAN 200. The user may then establish a streaming media session using device A 201 as a receiving device and device B 209 as a source. Media content, such as a video or audio file, located on the source device B 209 will then be streamed to device A 201 using the cloud server 103 as an intermediary. The cloud server 103 may then proceed with a method of operation illustrated by FIG. 16 beginning at block 1601 as shown. The cloud server 103 may send a request at predetermined time intervals to the source device B 209 requesting a battery power level as shown in block 1603.

The source device B 209 battery state monitor sends the battery power level in a status update which is received by the cloud server 103 as shown in block 1605. The cloud server 103 may also receive information about the media content from the application state monitor, and the time left to stream the remainder of the media content. In block 1607, the cloud server 103 determines whether the time remaining to complete streaming the media content ("$T_{REM}$") is greater than the time remaining until the source battery is discharged ("$T_{BAT}$"). If not, then the source device B 209 is allowed to continue the streaming media session in block 1609 and the cloud server 103 repeats the operation of block 1603 after the predetermined time period of timer 1613 until the media session is completed in block 1611. If the streaming media session is completed in block 1611 then the method of operation ends as shown in block 1621.

If in block 1607, the cloud server 103 determines that $T_{REM}$ is greater than $T_{BAT}$, the cloud server 103 controls the receiving device to establish a new streaming media session with a new source in block 1615, and ends the session with the existing source in block 1617. The receiving device will then continue the streaming media session from the new source in 1619 until the user terminates the media session, or until the session completes in block 1611, both of which end the streaming media session and method of operation as shown in block 1621. As shown, the method of operation beginning at block 1603 continues for any new source that may be invoked until the streaming media session is completed for the given media content. The application state monitor 1517 generates a pointer that is sent to the cloud server 103 either at block 1603 with the battery status or at block 1615 in response to another request from the cloud server 103. The pointer informs the new source of where in the media content to begin the streaming media session so that the user experiences a continuous appearing media stream on the receiving device. Management and coordination of the two streaming media sessions is handled by the cloud server 103 to provide a make-before-break like handoff of the streaming media context handoff. The receiving device and any of the source devices may establish the streaming media session via a peer-to-peer connection or through the server as intermediary. Additionally, the source may monitor its own battery conditions via battery state monitor 1521 and perform the determination of block 1607 and, if appropriate, engage the cloud server 103 to take over directing the streaming media session in response to a low battery condition at the source. The cloud server 103 will identify the new source device and establish the connection with device A 201 (i.e. the receiving device) via the device A 201 service module to either intermediate or to command device A 201 to establish a new peer-to-peer connection with the identified new source device.

FIG. 17 provides another method of operation for situations in which the media content is locally stored by the source device. The initial method of operation is similar to that of FIG. 16 and begins at block 1701. Similar to the method of operation of FIG. 16, the cloud server 103 may send a request at predetermined time intervals to a source requesting a battery power level in 1703 and receive a status update as shown in block 1705. The cloud server 103 may also receive information about the media content from the application state monitor of the source such as, but not limited to, the time left to stream the remainder of the media content and a pointer indicating the last position in the media file for which streaming data was sent to the receiving device. In block 1707, the cloud server 103 checks whether $T_{REM}$ is greater than $T_{BAT}$ similar to the method of operation shown in FIG. 16. If not, then the source device is allowed to continue the streaming media session in block 1709 and the cloud server 103 repeats the operation of block 1703 after the predetermined time period of timer 1713 until the media session is completed in block 1711. If the streaming media session is completed in block 1711 then the method of operation ends as shown in block 1729.

Different from the method of operation shown in FIG. 16, if $T_{REM}$ is greater than $T_{BAT}$ in 1707, the cloud server will receive the remaining media content (i.e. the media content portion that has not yet been streamed to the receiving device) as a compressed file from the source device at block 1715. That is, the cloud server 103 may send a request to the source device to compress and send any remaining portion of the media content in response to $T_{REM}$ being greater than $T_{BAT}$. The streaming content file compression 1525 module performs the file compression operation on the media file and may use any suitable file compression format to reduce the file size of the remaining media content file. This file compression is not to be confused with the file compression that may be inherent in media file formats such as, but not limited to, MP3, MP4 or etc., or various multimedia container formats, where compression is performed by audio or video codecs. Rather, file compression such a "ZIP" file format, or other suitable file compression format, is applied to the media file or to a portion of the media file. The purpose of compressing the media file is to decrease the transmission time and bandwidth required between the source device and the cloud server. However, in some embodiments, if bandwidth between the source and cloud server is sufficient, the entire media content file may be sent by the source to the cloud server without compression. In some embodiments, the media content file may be truncated by the source (i.e. by the source service module) based on the pointer position, i.e. the position at which data was last streamed to the receiving device. That is, only the remaining portion of the media content file is sent. In other embodiments, the media content file may be truncated and then compressed so that the source sends the smallest possible file to the cloud server.

It is to be understood that, in some embodiments, the determination of block 1707 may be performed by the service module of the source device. That is, some embodiments may use source initiated action rather than cloud server initiated action. For example, the source may determine that $T_{REM}$ is greater than $T_{BAT}$ and automatically upload the compressed remaining portion of the media content to the cloud server along with a pointer and a request to obtain a new source. In either of the source initiated embodiments or the cloud server initiated embodiments, the cloud server will perform the process in block 1717. In block 1717 the cloud server will either select a new source based on the peer table and status information for other PAN devices (such as battery power status, connectivity available, etc.), or will itself assume the role of source. That is, the cloud server may assume the source role or may delegate the source role to another PAN device per the peer table. Therefore the cloud server 103 may control the receiving device to establish a new streaming media session either with a new source in block 1719 or with the cloud server directly. In the case where another PAN device is selected as a new source, the cloud server will send the new source the compressed media file.

In 1721 the new source, which may be either a new source device or the cloud server, will proceed to decompress the media file and begin a streaming media session with the receiving device for the remaining media content. The streaming media session to the previous source is terminated in block 1723 and the receiving device will then continue the streaming media session from the new source in 1727 until the user terminates the media session, or until the session completes in block 1711. If the new streaming media source is the cloud server in block 1725 the streaming media session continues in block 1727 because there is no concern for battery power. However, if another PAN device has been selected to source the streaming media, then the operations of block 1703 are continued such that the source device battery condition is monitored. The method of operation ends in block 1729 when the user terminates the streaming media session or when the entire media content has been streamed to the receiving device.

While various embodiments have been illustrated and described, it is to be understood that the invention is not so limited. Numerous modifications, changes, variations, substitutions and equivalents will occur to those skilled in the art without departing from the scope of the present invention as defined by the appended claims.

What is claimed is:

1. A method comprising:

receiving, from a server at a second device, a first peer table, the first peer table including first application state information for a first application running on a first device, wherein the first application state information includes a first device profile for the first device, a first hardware address for the first device, and first context activity information for the first device;

providing, from the second device to the server, second application state information for a second application running on the second device, wherein the second application state information includes a second device profile for the second device, a second hardware address for the second device, and second context activity information for the second device;

after providing the second application state information to the server, receiving, from the server at the second device, a second peer table, the second peer table including the first application state information for the first application running on the first device and the second application state information for the second application running on the second device; and causing a login screen to be displayed on a display of the second device, the login screen providing information for the first application, based on the first application state information.

2. The method of claim 1, further comprising:

causing an icon corresponding to the first application to be displayed on the display on the second device.

3. The method of claim 2, wherein the first application state information also includes an application identifier, a content identifier, and a pointer, the pointer indicating a location at which first content is accessed by the first application.

4. The method of claim 3, further comprising:

running an application software stack on the second device based on the first application state information.

5. The method of claim 3, further comprising:

receiving at the second device a selection input via the icon corresponding to the first application; and launching a second application on the second device that is the same as the first application in response to the selection input.

6. The method of claim 5, further comprising:

obtaining login information for the second device from a cloud server; and automatically logging into the second device using the login information.

7. The method of claim 6, wherein the launching the second application on the second device in response to the selection input, comprises:

mirroring, on the second device, the first application state of the first application on the first device based on the first application state information.

8. The method of claim 7, wherein the mirroring, on the second device, of the first application state of the first application on the first device based on the first application state information, comprises:

accessing second content by the second device for use by the second application that is the same as the first content.

9. The method of claim 8, wherein the accessing the second content by the second device for use by the second application, comprises:

accessing the second content by the second device via a cloud server.

10. The method of claim 8, wherein the accessing the second content by the second device for use by the second application, comprises:

accessing the second content by the second device via a peer-to-peer connection with the first device.

11. An apparatus, comprising:

a display; and at least one hardware processor configured to:

receive, from a server, a peer table, a first peer table, the first peer table including first application state information for a first application running on a first device, wherein the first application state information includes a first device profile for the first device, a first hardware address for the first device, and first context activity information for the first device;

provide, to the server, second application state information for a second application running on the second device, wherein the second application state information includes a second device profile for the second device, a second hardware address for the second device, and second context activity information for the second device;

after providing the second application state information to the server, receive, from the server, a second peer table, the second peer table including the first application state information for the first application running on the first device and the second application state information for the second application running on the second device; and cause a login screen to be displayed on the display, the login screen providing information for the first application, based on the first application state information.

12. The apparatus of claim 11, wherein the at least one hardware processor is further configured to cause an icon corresponding to the first application to be displayed on the display.

13. The apparatus of claim 12, wherein the first application state information also includes an application identifier, a content identifier, and a pointer, the pointer indicating a location at which the first content is accessed by the first application.

14. The apparatus of claim 13, wherein the at least one hardware processor is further configured to run an application software stack based on the first application state information.

15. The apparatus of claim 13, wherein the at least one hardware processor is further configured to:

receive a selection input via the icon corresponding to the first application; and launch a second application on the second device that is the same as the first application in response to the selection input.

16. The apparatus of claim 15, wherein the at least one hardware processor is further configured to:

obtain login information from a cloud server; and automatically login using the login information.

17. The apparatus of claim 16, wherein the at least one hardware processor is further configured to mirror the first application state of the first application based on the first application state information.

18. The apparatus of claim 17, wherein the at least one hardware processor is further configured to access second content for use by the second application that is the same as the first content.

19. The apparatus of claim 18, wherein the at least one hardware processor is further operative configured to access the identical second content via a peer-to-peer connection with the first device.

20. A non-transitory computer-readable medium containing computer-executable instructions that, when executed by a processor on a second device, causes the processor to perform a method, the method comprising:

receiving, from a server, a first peer table, the first peer table including first application state information for a first application running on a first device, wherein the first application state information includes a first device profile for the first device, a first hardware address for the first device, and first context activity information for the first device;

providing, to the server, second application state information for a second application running on the second device, wherein the second application state information includes a second device profile for the second device, a second hardware address for the second device, and second context activity information for the second device;

after providing the second application state information to the server, receiving, from the server, a second peer table, the second peer table including the first application state information for the first application running on the first device and the second application state information for the second application running on the second device; and causing a login screen to be displayed on a display of the second device, the login screen providing information for the first application, based on the first application state information.

* * * * *